(12) United States Patent
Oertley

(10) Patent No.: US 6,280,009 B1
(45) Date of Patent: Aug. 28, 2001

(54) SOUND REDUCING CARRIER ROLLER

(75) Inventor: Thomas E. Oertley, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/454,960

(22) Filed: Dec. 3, 1999

(51) Int. Cl.$^7$ .......................... B62D 55/096; B62D 55/14
(52) U.S. Cl. .............................. 305/136; 305/137
(58) Field of Search .................................. 305/124, 129, 305/136, 137, 142; 295/7, 11

(56) References Cited

U.S. PATENT DOCUMENTS

| | | |
|---|---|---|
| Re. 30,039 | 6/1979 | Clemens et al. . |
| 2,647,025 | 7/1953 | Deffenbaugh . |
| 3,504,562 | 4/1970 | Hirych . |
| 3,578,822 | 5/1971 | Slemmons . |
| 3,580,093 | 5/1971 | Tomizawa . |
| 3,797,895 * | 3/1974 | Tomizawa ........................ 305/136 |
| 3,910,128 * | 10/1975 | Boggs et al. ..................... 305/136 X |
| 3,937,528 | 2/1976 | Clemens et al. . |
| 3,996,810 | 12/1976 | Groff . |
| 4,083,237 | 4/1978 | Umezaki et al. . |
| 4,818,041 | 4/1989 | Oertley . |
| 4,890,892 | 1/1990 | Haslett . |

* cited by examiner

*Primary Examiner*—Russell D. Stormer
(74) *Attorney, Agent, or Firm*—Calvin E. Glastetter

(57) ABSTRACT

A sound reducing carrier roller supports and guides portions of an endless track of a track-type machine as that portion of the track travels between a drive wheel and an idler wheel of the machine. A portion of a rim segment is solidly mounted to the roller shell while a gap is maintained between the rest of the rim segment and the roller shell. A resilient ring is positioned between the segment and the roller shell to reduce noise and impact load on the roller assembly. Conventional track rollers have metal to metal contact between the rim and the roller shell which can generate noise and impact therebetween. The subject roller assembly, with rim segments resiliently mounted, reduces the noise and impact levels.

7 Claims, 2 Drawing Sheets

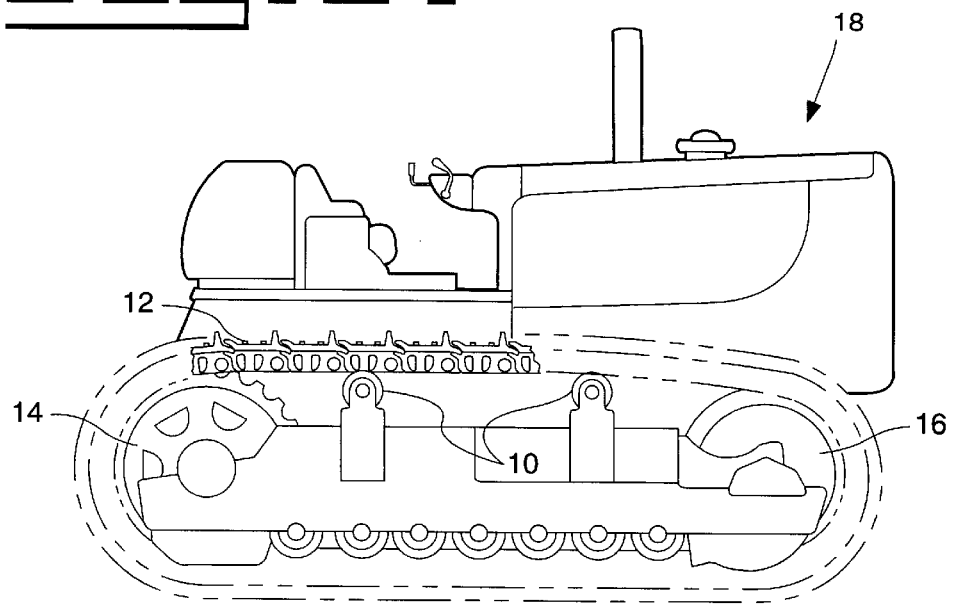
Fig_1_
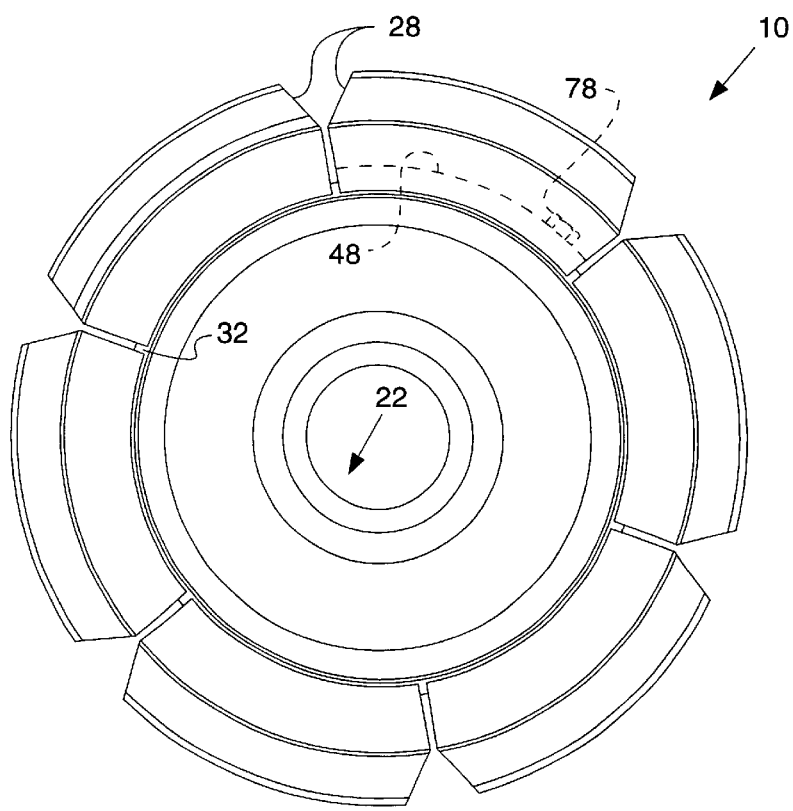
Fig_3_

SOUND REDUCING CARRIER ROLLER

TECHNICAL FIELD

This invention relates to track rollers assemblies for supporting and guiding the endless track of a track-type machine and more particularly to a track roller assembly having segmented resiliently supported rim portions for reducing noise as the endless track contacts the rim.

BACKGROUND ART

Self-laying track-type machines utilize an endless track chain assembly joined together by interconnected link assemblies. The link assemblies include overlapping link members which form a pair of continuous rails. Track guiding carrier rollers engage the rails as the chain assembly rotates about a drive sprocket wheel and one or more idler wheels.

One or more carrier rollers guide and support the upper portion of the track chain assembly between the idler wheel and the drive sprocket wheel. The carrier rollers generally rotate as the track rails engage the rim portions of the rollers. Considerable noise is generated from metal to metal contact of the roller rims with the rails. This noise is often magnified by other components of the machine.

One type of track roller having a replaceable rim and elastic ring below the rim is disclosed in U.S. Pat. No. 3,580,093, issued on May 25, 1971, to K. Tomizawa. The replaceable rim is a metal ring and the elastic ring is made of rubber or synthetic resin. An end plate having an outer flange is secured to the roller hub and holds the rim and elastic ring in place. This arrangement requires the outer flanged plates to hold the rim and elastic ring in place.

Another type of track roller having a resilient mounted rim is disclosed in U.S. Pat. No. 2,647,025, issued Jul. 28, 1953, to J. L. Deffenbaugh. The rim is one piece and a resilient sleeve is positioned between the rim and the hub. The sleeve is bonded to the hub and snap rings are used to retain the rim on the sleeve.

The present invention is directed to overcome one or more of the problems as set forth above.

DISCLOSURE OF THE INVENTION

In one aspect of the present invention a carrier roller assembly for guiding and supporting the endless track of a track-type machine includes a mounting shaft. The roller includes a shell having first and second end portions and an intermediate portion. A plurality of bearing are positioned between the roller shell and the mounting shaft. A plurality of segments having first and second end portions and an intermediate portion are positioned around the roller shell to define a rim having substantially continuous track bearing surfaces thereon and positioned for the intermediate portion to contact the intermediate portion of the roller shell. A first resilient ring is positioned around the first end portion of the roller shell to support the first end portion of the rim member. A second resilient ring is positioned around the second end portion of the roller shell to support the second end portion of the rim member.

The present invention provides a carrier roller assembly having reduced noise when the track links contact and impact the rim of the roller. The assembly includes a first resilient ring being positioned between the first ends of the rim segments and roller shell. A second resilient ring is positioned between the second ends of the rim segment and the roller shell. The resilient rings will maintain a gap between the ends to reduce noise from the rim into the roller shell while allowing a portion of the segment to solid mount on the roller shell.

BRIEF DESCRIPTION OF THE DRAWINGS

FIG. 1 is a diagrammatic side elevational view of a track-type machine incorporating the roller assembly of the present invention;

FIG. 3 is a diagrammatic opposite side view, on an enlarged scale, of the roller assembly.

BEST MODE FOR CARRYING OUT THE INVENTION

Figure 2:
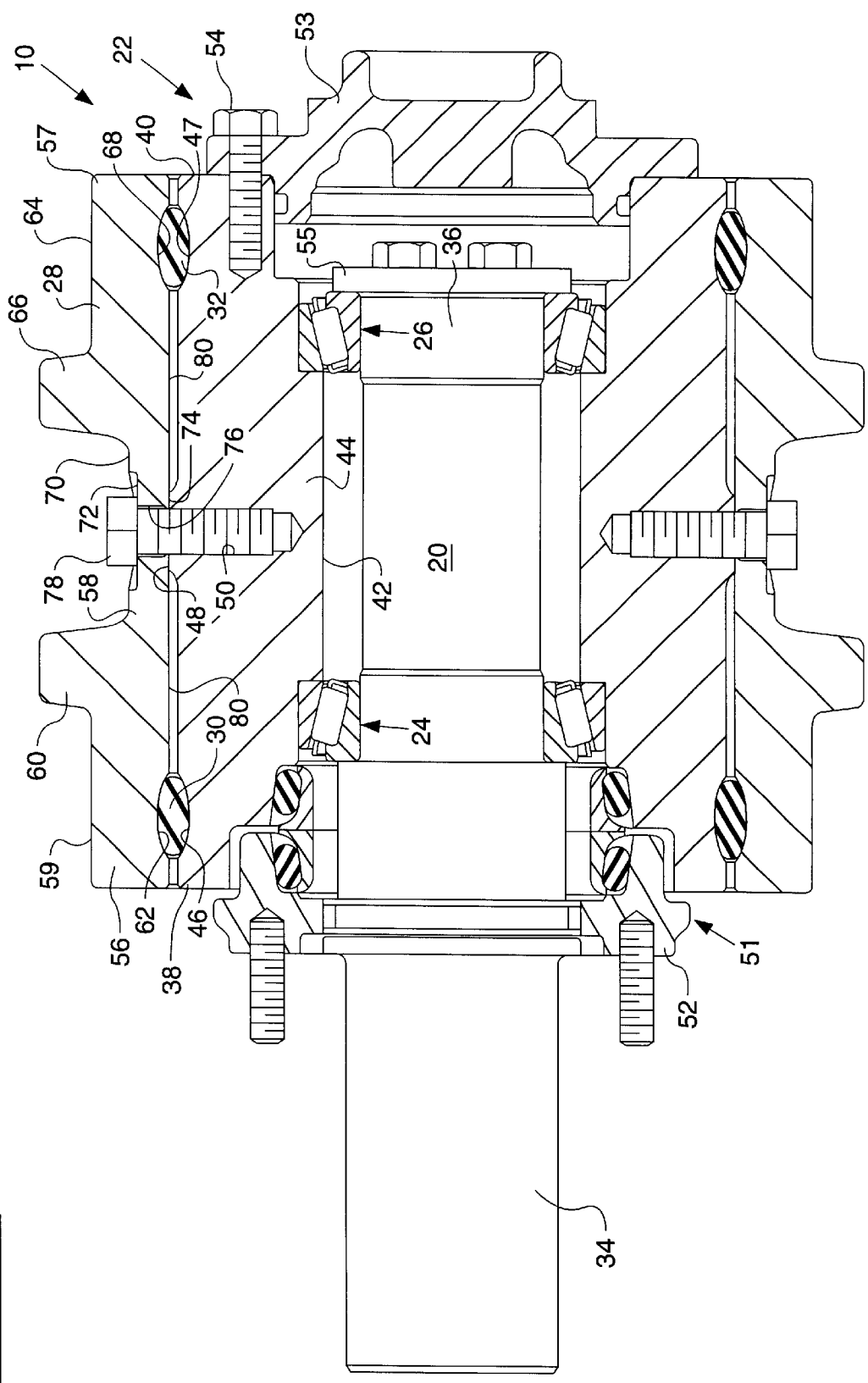
FIG. 2 is a diagrammatic sectional view, on an enlarged scale, of one of the roller assemblies of the present invention.

With reference to the drawings, a noise reducing roller assembly 10, for guiding and supporting portions of an endless track 12 between a drive wheel 14 and an idler wheel 16 of a track-type machine 18, includes a mounting shaft 20, a roller shell 22, first and second bearing assemblies 24,26, a plurality of rim segments 28, and first and second resilient non-metallic supporting rings 30,32. The mounting shaft 20 has a first end portion 34 for mounting to the machine 18, and a second roller supporting end portion 36. The roller shell 22 has first and second end portions 38,40, an axial throughbore 42, an intermediate portion 44. The first and second end portions 38,40 each have an annular groove 46,47 around the circumference. The intermediate portion 44 of the roller shell has a raised annular mounting surface 48. A plurality of threaded holes 50 extend from the mounting surface 48 toward the mounting shaft 20. The first and second bearing assemblies 24,26 are positioned between the roller shell axial throughbore 42 and the mounting shaft 20 second end portion 36, and provide relative rotation between the shaft 20 and the roller shell 22.

The roller assembly further includes a seal assembly 51 and a first retainer plate 52 associated with the first end portion 38 of the roller shell 22, and a cover plate 53 secured by a plurality of threaded fasteners 54 to the second end portion 40 of the roller shell 22. A second retainer plate 55 secured to the second end portion 36 of the shaft 20 hold the shaft 20 and the roller shell 22 together.

The first resilient ring 30 is positioned in the groove 46 in the first end portion 38 of the roller shell 22. The second resilient ring 32 is positioned in the groove 47 in the second end portion 40 of the roller shell 22.

Each segment of the plurality 28 has an arcuate shape and includes a first end portion 56, a second end portion 57 and an intermediate portion 58. The first end portion 56 includes a contact surface 59 and a radial flange 60 for supporting and guiding the endless track 12. The first end portion 56 also includes an arcute groove 62 which is aligned with the groove 46 in first end portion 38 of the roller shell 22 and the first resilient ring 30. The second end portion 57 includes a contact surface 64 and a radial flange 66 for supporting and guiding the endless track 12. The second end portion 57 also includes an arcute groove 68 which is aligned with the groove 47 in the second end portion 40 of the roller shell 22 and the second resilient ring 32. The intermediate portion 58 has an outer surface 70 having a formed pad 72 and an inner surface 74 which rests on and contacts the raised annular mounting surface 48 of the roller shell 22. A mounting hole 76 in the segment 28 extends from the pad 72 to the inner surface 74.

A threaded fastener such as a bolt 78 passes through the mounting hole 76 in the segment 28 and is turned into the threaded hole 50 in the roller shell 22. As the bolt 78 is tightened the resilient rings 30,32 are highly compressed and highly constrained in the grooves 46,62,47,68. The bolt 78 is tightened until the intermediate portion 58 of the segment 28 contacts the raised mounting surface 48 of the roller shell 22. With the mounting surface 48 of the roller shell 22 being higher than first and second end portions 38,40 a solid abutment is provides around the bolt 78 while a gap 80 is maintained between end portions. The resilient rings 30,32 will absorb the impact load and reduce bending strain on the segments and bolt 78 bending when the segment 28 is only impacted on one of the contact surfaces 59,64. The resilient rings also provide damping on the segments 28 to prevent ringing when it is not in contact with the track.

INDUSTRIAL APPLICABILITY

In use the subject roller assembly 10 is particularly useful for reducing noise and impact levels between the roller assembly 10 and the link rails of the moving endless track 12 of a track-type machine 18. The link rails contact the rim segments 28 as the track 12 and the roller assembly 10 rotate. The noise and impact generated by metal to metal contact is not transferred into the remainder of the roller assembly 10, or other components of the machine 18, because of the resilient rings 30,32 supporting the segments 28. When the segments become worn, they can be replaced without replacing the entire roller assembly 40.

In view of the forgoing, it is readily apparent that the structure of the present invention provides a carrier roller assembly which provides a reduction in noise as the track assembly contacts and impacts the carrier roller. With the segmented roller rim being resiliently supported noise is dampened and not transmitted into the roller structure.

Other aspects, objects and advantages of this invention can be obtained from a study of the drawings, the disclosure and the appended claims.

What is claimed is:

1. A carrier roller assembly for guiding and supporting the endless track of a track-type machine, comprising:

a mounting shaft having a first mounting end portion and a second roller supporting end portion;

a roller shell having a first end portion, a second end portion, and an intermediate portion, having a raised annular mounting surface with a plurality of threaded holes extending radially therefrom toward the mounting shaft, the roller shell having an axial throughbore;

a plurality of bearing assemblies positioned between the roller shell axial throughbore and the mounting shaft second end portion;

a plurality of arcuate segments having a first end portion, a second end portion, and an intermediate portion, the segments being circumferentially disposed on the roller shell to define a rim having substantially continuous track bearing surfaces thereon and positioned for the intermediate portion to contact the intermediate portion of the roller shell, the intermediate portion of each rim segment includes a plurality of mounting holes and is releasably attached to the intermediate portion of the roller shell;

a first resilient ring around the first end portion of the roller shell to resiliently support the first end portion of the rim segment; and a second resilient ring around the second end portion of the roller shell to resiliently support the second end portion of the rim segment.

2. The carrier roller assembly, as set forth in claim 1, includes a bolt which passes through the mounting hole of the rim segment and is threadably engaged with the threaded hole in the roller shell to join the rim segment to the raised annular mounting surface.

3. The carrier roller assembly, as set forth in claim 1, wherein the first and second end portions of the roller shell includes an annular groove.

4. The carrier roller assembly, as set forth in claim 3, wherein the first and second end portions of the rim segment includes arcuate grooves.

5. The carrier roller assembly, as set forth in claim 4, wherein the resilient ring is positioned in the groove of the roller shell and the rim segment to support the ends of the rim segments to dampen noise.

6. A track-type machine having an endless track assembly with a carrier roller assembly for guiding and supporting the endless track, comprising;

a mounting shaft having first and second end portions;

a roller shell having a first and second end portion, the roller shall includes an intermediate portion having a raised annular mounting surface with a plurality of threaded holes extending radially therefrom toward the mounting shaft;

a plurality of arcuate segments having fist and second end portions and a intermediate portion releaseably attached to the intermediate portion of the roller shell, the segments being disposed on the roller shell to define a rim having substantially continuous track bearing surface thereon;

first and second resilient rings around the roller shell to support the rim segments to reduce noise when the endless track contacts the guide segments.

7. The track-type machine, as set forth in claim 6, wherein the first resilient ring is positioned between the first end portion of the roller shell and the first end portion of the rim segment and the second resilient ring is positioned between the second end portion of the roller shell and the second end portion of the rim segment.

* * * * *